June 24, 1930.  P. B. McCHESNEY  1,767,995
CURRENT MOTOR
Filed June 11, 1929   2 Sheets-Sheet 1

INVENTOR.
P. B. McChesney
BY
ATTORNEY

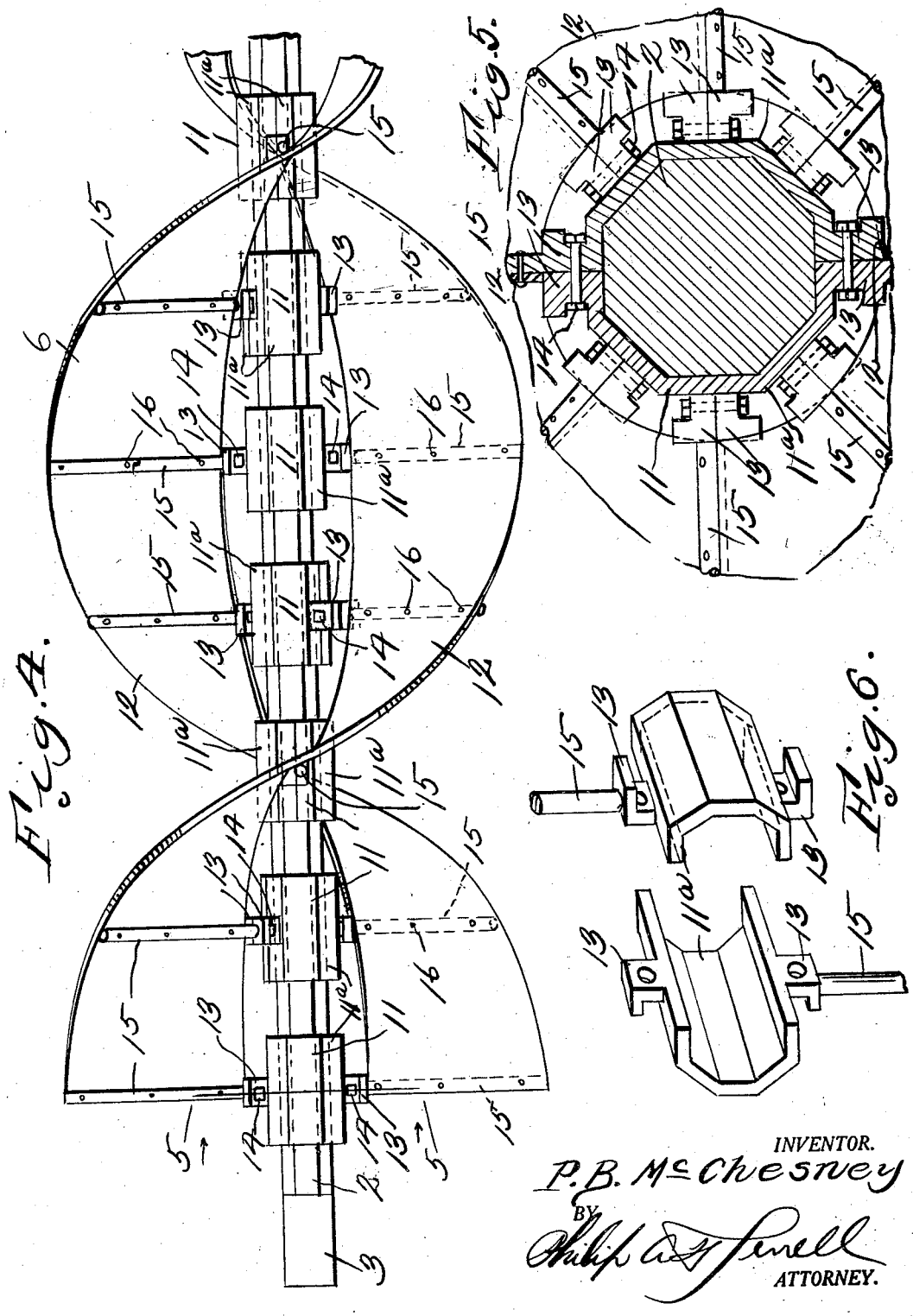

Patented June 24, 1930

1,767,995

UNITED STATES PATENT OFFICE

PRESLEY B. McCHESNEY, OF BOWLING GREEN, KENTUCKY

CURRENT MOTOR

Application filed June 11, 1929. Serial No. 370,123.

The invention relates to current motors and has for its object to provide a device of this character comprising a shaft extending diagonally across the stream and having mounted thereon screw impellers against which the current impinges for imparting rotation to the shaft and driving connections between the shaft and a second shaft which may lead to any suitable source or position for utilizing the power generated by the rotatable screw.

A further object is to form the screw from a shaft angularly shaped in vertical transverse cross section thereby forming a plurality of surfaces and to provide separable sleeves on the shaft and conforming to the shape of the shaft and provided with radial arms to which are secured spirally arranged vanes for forming the screw.

A further object is to provide a current motor screw comprising a hexagonally shaped shaft having slidably mounted thereon similarly shaped sleeves formed from connected sections, and which sleeves are provided with radially extending arms extending from the flat surfaces thereof at opposite sides of the sleeve, thereby allowing the arms to be accurately and spirally arranged for the reception of the vanes which are connected to the arms.

A further object is to construct the sleeves from similarly shaped sections having the arms formed integral therewith, whereby said sections will be interchangeable in relation with each other in the same sleeve or in different sleeves, thereby reducing the cost of manufacture to a minimum.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 4 is an enlarged plan view of one end of the motor screw.

Figure 5 is a vertical transverse sectional view taken on line 5—5 of Figure 4.

Figure 6 is a perspective view of the sleeve sections showing the same in position to be assembled.

Figure 1:
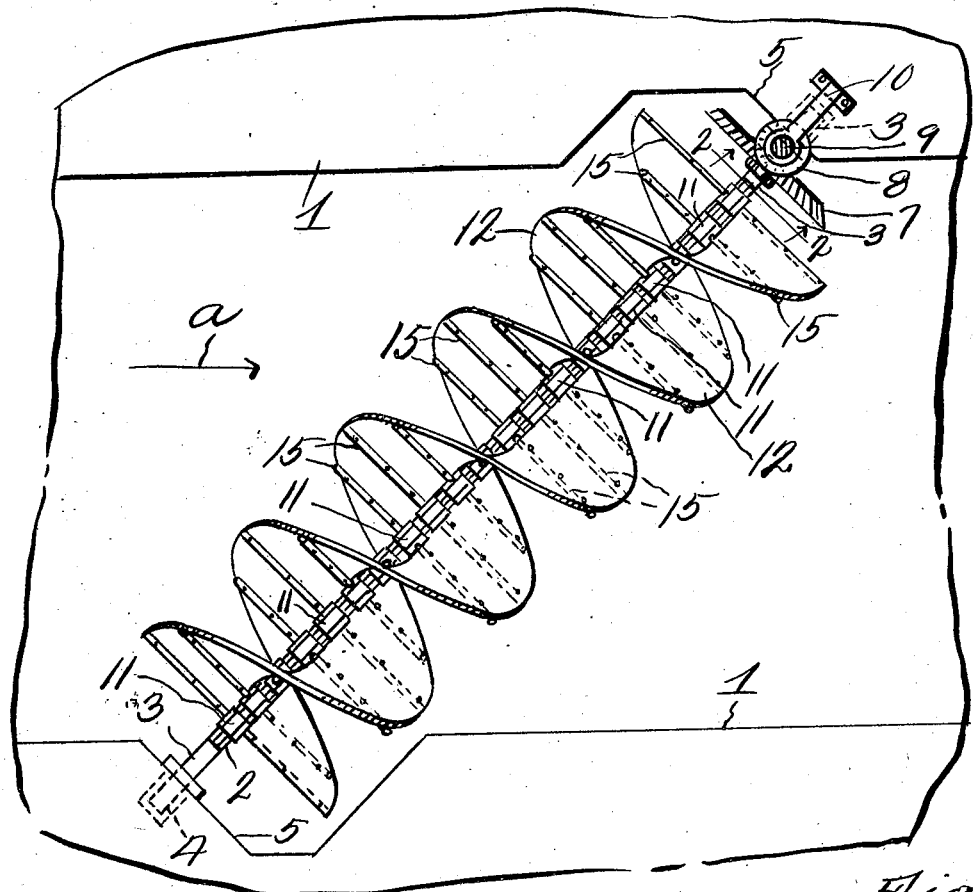
Figure 1 is a plan view of the current motor showing the same in position in a stream.
Figure 2:
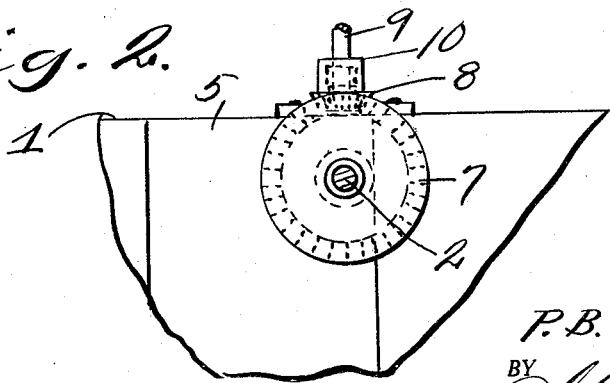
Figure 2 is a detail sectional view taken on line 2—2 of Figure 1.
Figure 3:
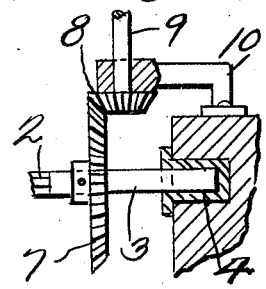
Figure 3 is a vertical longitudinal sectional view through the driving connection at the end of the shaft.

Referring to the drawings, the numeral 1 designates the opposite banks or sides of a stream, which for purposes of illustration flows in the direction of the arrow $a$. Extending diagonally across the stream is a hexagon shaped shaft 2, the ends 3 of which are preferably round and rotably mounted in bearings 4 in the recesses 5 in the opposite banks, whereby the current actuated screw hereinafter set forth will be rotated. Mounted on the shaft 2 are spiral vanes 6, which form the screw, and against which vanes the current impinges for rotating the screw as a whole for generating power. The power take off comprises a gear 7 carried by one end of the shaft 2, and which gear meshes with a bevelled gear 8 carried by a shaft 9, which shaft may lead to any suitable machinery to be operated and applicant does not limit himself in this particular. The shaft 9 is preferably supported by a bracket 10 mounted on the banks. Devices of this character are preferably made large, consequently the machine work should be reduced to the minimum and the parts constructed in a manner whereby the same can be quickly and easily assembled, even if the shaft is in position in the stream, and the particular construction hereinafter set forth accomplishes this result.

The device is formed from a plurality of spaced sleeves 11 which are mounted on the hexagon saped portion of the shaft 2 and conform with the shape of the shaft whereby they will rotate therewith and the sleeves are preferably slidably mounted on the shaft so they can be easily positioned for receiving the spiral vanes 12 when placed in position. The sleeves 11 are formed from registering sections 11ª which are provided with outwardly extending flanges 13, through which the securing bolts 14 extend. Extending outwardly from one of the flanges 13 of the sections 11ª are arms 15, which arms when the sections are brought together, are regularly disposed in relation to the shaft 2, and in relation to the flat surfaces of the shaft. It will be noted that both sections 11ª can be formed from the same mold, thereby reducing the cost of manufacture to a minimum and making the parts interchangeable as far as the sleeves are concerned. By making the shaft 2 angularly shaped in cross section, sleeves can be placed in position so that the arms will extend outwardly from the various surfaces of the shaft thereby allowing a stepped arrangement spirally of the arms 15 over which the spiral vanes 12 may be placed and secured to the arms at 16, as clearly shown in Figure 1. Although the shaft 2 is shown hexagonally shaped, it is to be understood that applicant does not limit himself to this particular angular shape, and the shaft may have as many longitudinal flat surfaces as desired. In assembling when the shaft 2 is in the stream, it is obvious that the sleeves can be placed on the shaft and forced outwardly, and the device assembled on the shaft in this manner, thereby obviating the necessity of transporting the device as an assembled one to the point of use.

From the above it will be seen that a current motor is provided of the screw type, wherein the use of machined parts is reduced to a minimum and if desired a wooden shaft may be used.

The invention having been set forth what is claimed as new and useful is:—

1. A current motor comprising an elongated shaft angularly shaped in vertical transverse cross section, a plurality of sleeves mounted on said shaft and conforming in transverse shape to the transverse shape of the shaft, said sleeve being formed from registering sections, said sections at opposite sides thereof having outwardly extending lugs, the lugs of adjacent sections being secured together, arms carried by one sleeve section lug and extending in opposite directions, said arms of adjacent sleeves extending outwardly in relation to the shaft radially from the flat surfaces thereof and in spiral alinement, and spiral vanes extending around the shaft and secured to said arms.

2. A current motor comprising a shaft hexagon shaped in cross section, hexagon shaped sleeves mounted on said shaft in spaced relation, said sleeves being formed from registering sections, lugs carried by the sections at opposite sides thereof and engaging each other, securing means extending through said lugs, arms carried by one of the lugs of each sleeve section and extending radially in opposite directions in relation to the shaft, said arms progressvely extending outwardly from the surfaces of the shaft, and spiral vanes extending around the shaft and carried by said arms.

In testimony whereof he hereunto affixes his signature.

PRESLEY B. McCHESNEY.